(12) United States Patent
Saito et al.

(10) Patent No.: US 7,458,593 B2
(45) Date of Patent: Dec. 2, 2008

(54) SUPPORT STRUCTURE OF MOTOR-DRIVEN STEERING ASSIST APPARATUS

(75) Inventors: Mitsuo Saito, Tochigi (JP); Koichi Hata, Tochigi (JP)

(73) Assignee: Showa Corporation, Saitama (JP)

( * ) Notice: Subject to any disclaimer, the term of this patent is extended or adjusted under 35 U.S.C. 154(b) by 357 days.

(21) Appl. No.: 11/223,184

(22) Filed: Sep. 9, 2005

(65) Prior Publication Data
US 2006/0175124 A1 Aug. 10, 2006

(30) Foreign Application Priority Data
Jan. 27, 2005 (JP) ............... 2005-020404
Jan. 27, 2005 (JP) ............... 2005-020407

(51) Int. Cl.
*B62D 7/22* (2006.01)
(52) U.S. Cl. ........................ 280/89; 280/272
(58) Field of Classification Search ............ 280/89, 280/272
See application file for complete search history.

(56) References Cited

U.S. PATENT DOCUMENTS

| 823,971 | A | * | 6/1906 | Remondy | 192/223.4 |
| 905,912 | A | * | 12/1908 | Nehring | 192/223 |
| 3,825,086 | A | * | 7/1974 | Bombardier | 280/21.1 |
| 5,505,493 | A | * | 4/1996 | Camfield et al. | 280/828 |
| 6,170,841 | B1 | * | 1/2001 | Mizuta | 280/89 |
| 7,243,931 | B2 | * | 7/2007 | Chen | 280/87.042 |

FOREIGN PATENT DOCUMENTS

JP 3-001877 1/1991
JP 2004-231011 A 8/2004

* cited by examiner

*Primary Examiner*—Lesley D. Morris
*Assistant Examiner*—Marlon A Arce Diaz
(74) *Attorney, Agent, or Firm*—Orum & Roth, LLC

(57) ABSTRACT

In a support structure of a motor-driven steering assist apparatus interposed between an upper steering shaft in a steering wheel side and a lower steering shaft in a tire wheel side, a steering angle regulating means for limiting a maximum steering angle of the upper steering shaft is provided between the upper steering shaft and a vehicle body side.

4 Claims, 4 Drawing Sheets

SUPPORT STRUCTURE OF MOTOR-DRIVEN STEERING ASSIST APPARATUS

BACKGROUND OF THE INVENTION

1. Field of the Invention

The present invention relates to a support structure of a motor-driven steering assist apparatus.

2. Description of the Invention

In a rough road traveling vehicle such as a buggy vehicle or the like, as described in Japanese Patent Application Laid-open No. 2004-231011 (patent document 1), there is a structure in which a motor-driven steering assist apparatus is interposed between an upper steering shaft in a steering wheel side and a lower steering shaft in a tire wheel side. A steering force applied to the steering wheel by a driver is assisted by a torque generated by an electric motor.

In the motor-driven steering assist apparatus in the patent document 1, a single unit body covered by a housing has an input shaft to which the upper steering shaft is connected, and an output shaft to which the lower steering shaft is connected. A torque sensor is provided between the input shaft and the output shaft. An electric motor is driven in correspondence to a detected torque of the torque sensor. A worm gear is coupled to a rotary shaft of the electric motor, and a worm wheel is coupled to the output shaft and engaging with the worm gear built-in. The housing can be attached to a vehicle body frame (a vehicle body side bracket). When the steering torque is applied to the steering wheel, the steering torque is applied to a torsion bar coupling the input shaft and the output shaft via the upper steering shaft, and the input shaft and the output shaft relatively rotate on the basis of a torsion generated by the torsion bar. Accordingly, the torque sensor detects the steering torque on the basis of a displacement in a rotating direction of the input shaft and the output shaft, and the electric motor is controlled so as to apply an assist force in correspondence to the steering torque to the output shaft.

In the motor-driven steering assist apparatus provided in the conventional rough road traveling vehicle, when steering the steering wheel to the maximum, the upper steering shaft and the input shaft twists the torsion bar, so that the torque sensor carries on detecting the steering torque. Accordingly, the electric motor is continuously driven despite that the output shaft and the lower steering shaft reach a steering stroke end.

Further, in the motor-driven steering assist apparatus provided in the conventional rough road traveling vehicle, if an inverse input is continuously input from the tire wheel side due to a rock being caught on the tire wheel during steering the steering wheel to the maximum, the lower steering shaft and the output shaft continues twisting the torsion bar, so that the torque sensor continues to detect the steering torque. Accordingly, the electric motor is continuously driven despite that the output shaft and the lower steering shaft reach the steering stroke end, thereby experiencing breakage such as a burnout or the like.

SUMMARY OF THE INVENTION

An object of the present invention is to avoid the electric motor from being driven to no purpose in a state in which the steering wheel is steered to the maximum, in the motor-driven steering assist apparatus.

Further, an object of the present invention is to avoid the electric motor from being driven to no purpose even if the inverse input is applied from the tire wheel side in a state in which the steering wheel is steered to the maximum, in the motor-driven steering assist apparatus.

The present invention relates to a support structure of a motor-driven steering assist apparatus interposed between an upper steering shaft in a steering wheel side and a lower steering shaft in a tire wheel side. A steering angle regulating means for limiting a maximum steering angle of the upper steering shaft is provided between the upper steering shaft and the vehicle body side.

The present invention relates to a support structure of a motor-driven steering assist apparatus interposed between an upper steering shaft in a steering wheel side and a lower steering shaft in a tire wheel side. A steering angle regulating means for limiting a maximum steering angle of the lower steering shaft is provided between the lower steering shaft and the vehicle body side.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
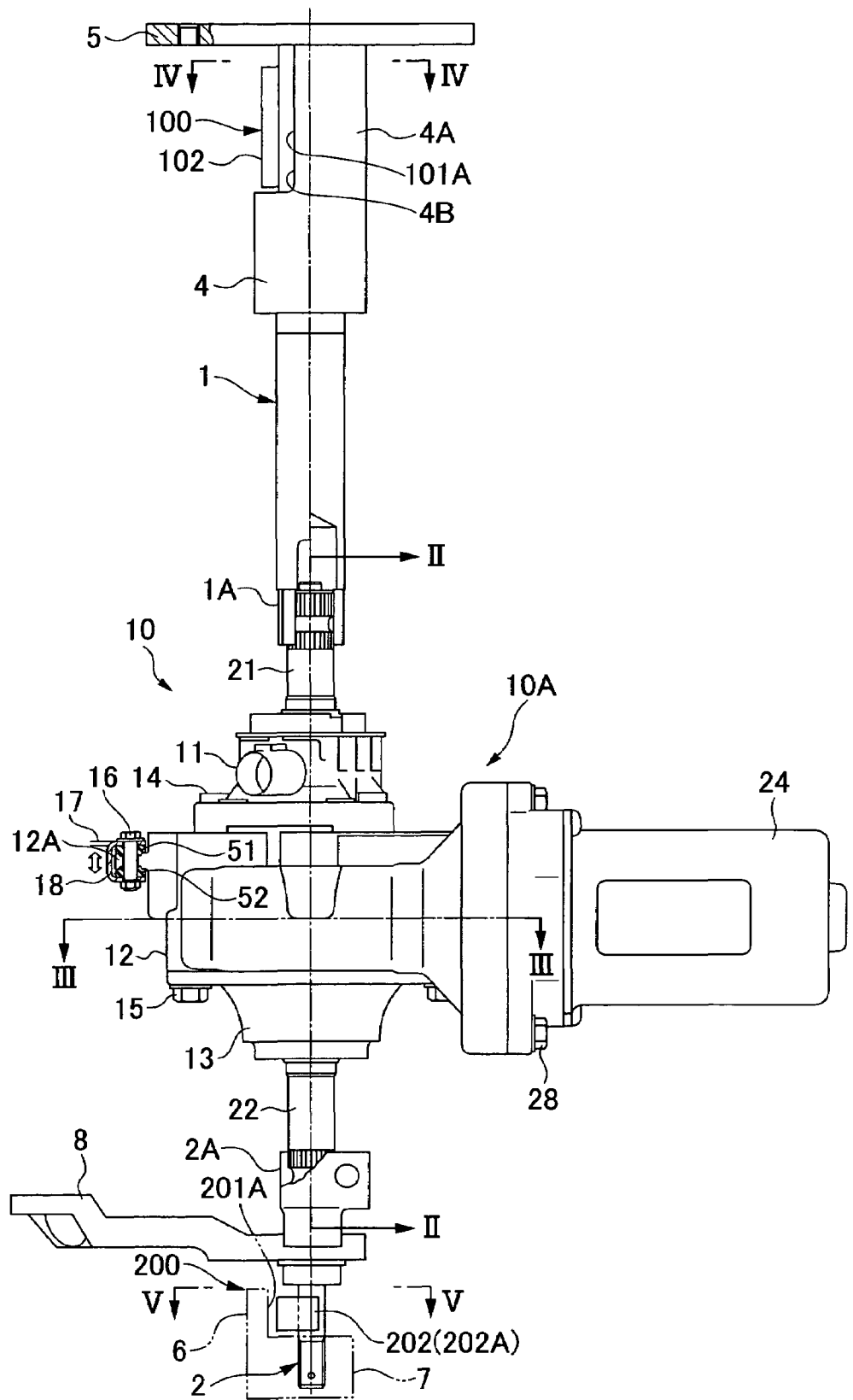
FIG. 1 is a schematic view showing a support structure of a motor-driven steering assist apparatus.

A motor-driven steering assist apparatus 10 is applied to a rough road traveling vehicle, for example, a buggy vehicle, a snowmobile or the like. The apparatus is interposed between an upper steering shaft 1 in a steering wheel side and a lower steering shaft 2 in a tire wheel side, and assists a steering force applied to the steering wheel by a driver on the basis of torque generated by an electric motor 24.

The motor-driven steering assist apparatus 10 rotatably supports the upper steering shaft 1 to an upper vehicle body side stay 3 via a bearing by a support member 4, and a steering wheel attaching member 5 is fixed to an upper end portion thereof. The lower steering shaft 2 is rotatably supported to a lower vehicle body side stay 6 via a bearing by a support member 7, and a pitman arm 8 is fixed to an intermediate portion thereof. The pitman arm 8 is coupled to a front tire wheel via right and left tie rods. The upper vehicle body side stay 3 and the lower vehicle body side stay 6 are supported to a vehicle body frame.

Figure 2:
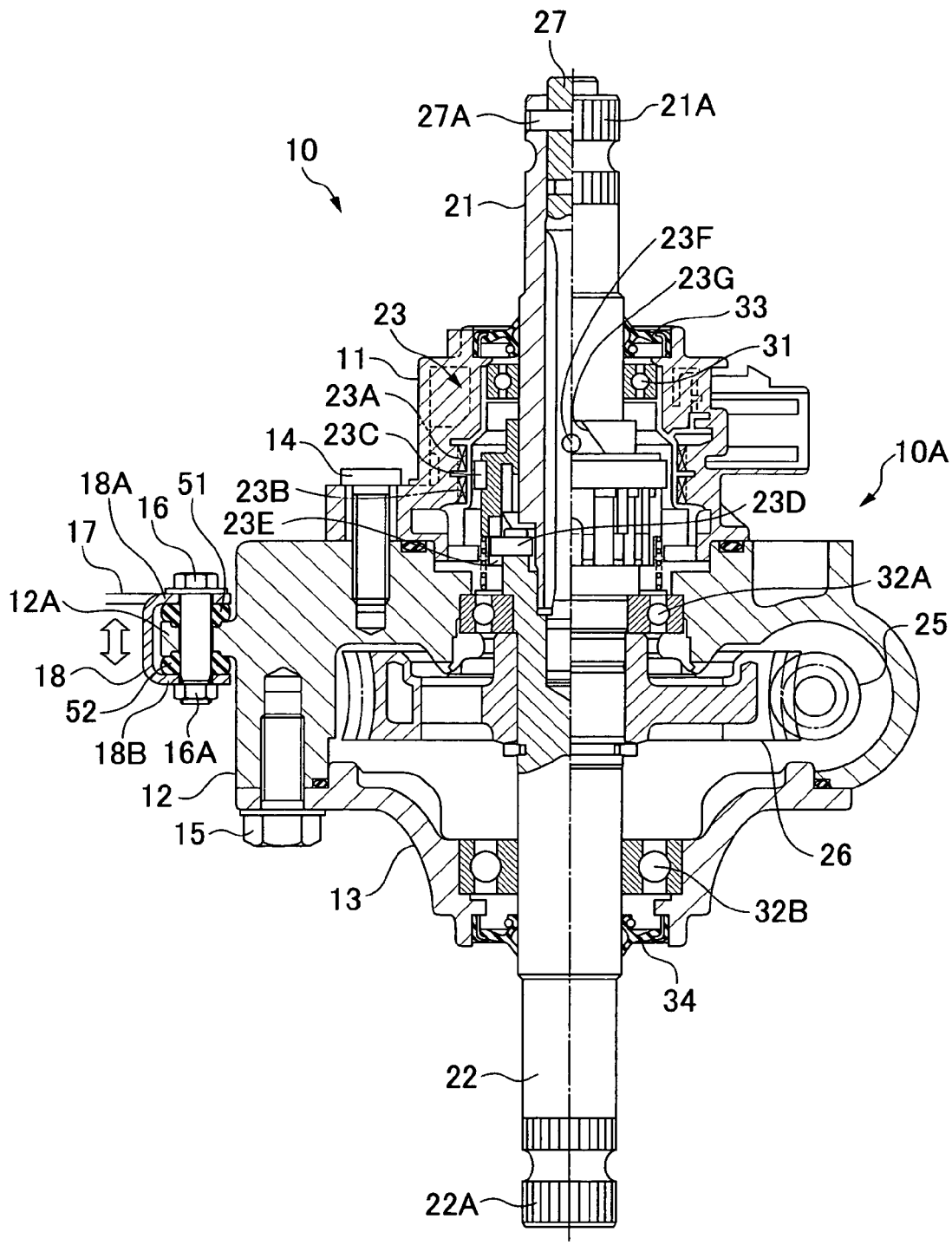
FIG. 2 is a cross sectional view along a line II-II in FIG. 1.
Figure 3:
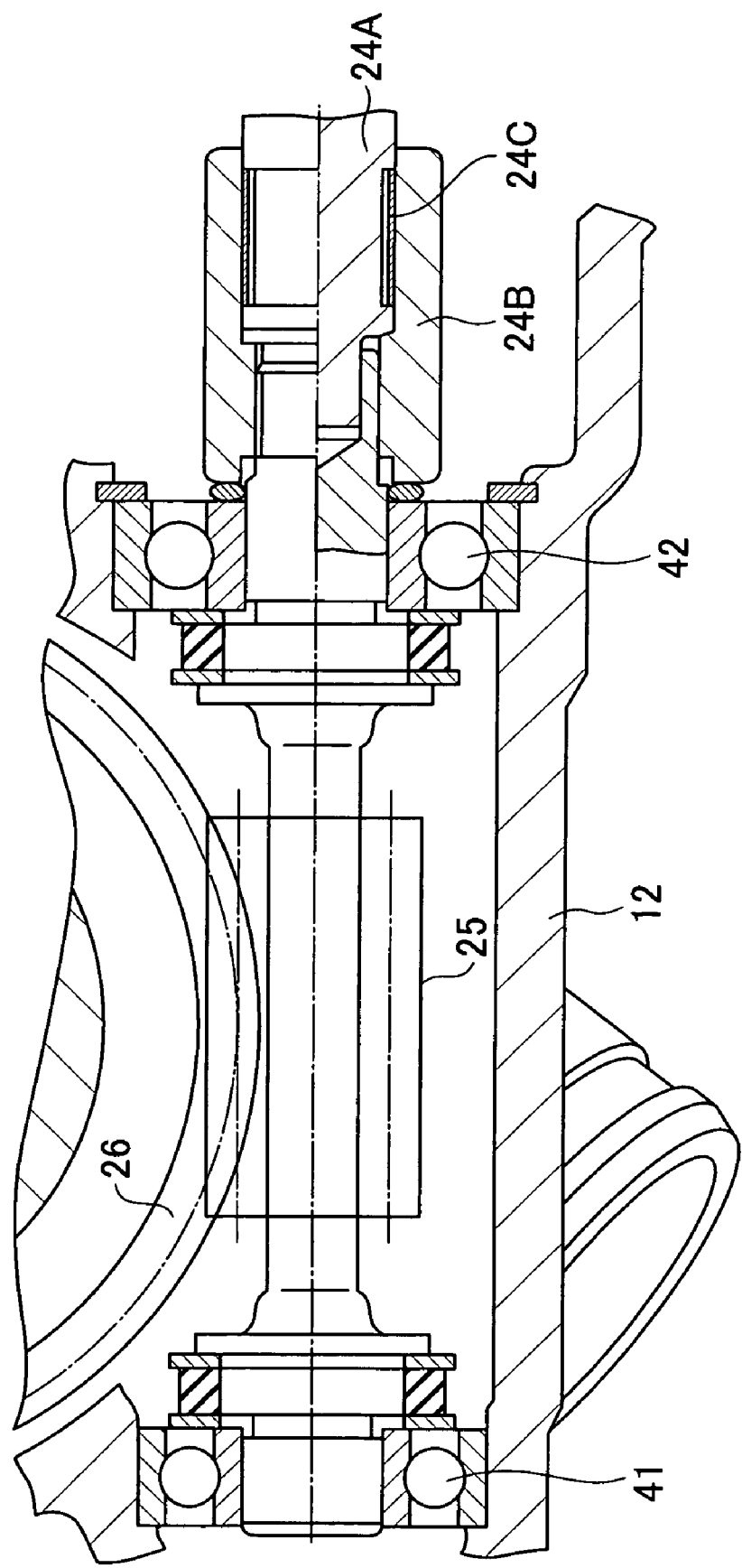
FIG. 3 is a cross sectional view along a line III-III in FIG. 1.

The motor-driven steering assist apparatus 10 has a single unit body 10A covered by first housing 11 (upper housing or upper cover), second housing (main housing), and third housing (lower housing or lower cover) 13, as shown in FIGS. 1 to 3. The unit body 10A has an input shaft 21, an output shaft 22, a torque sensor 23, an electric motor 24, a worm gear 25 and a worm wheel 26 built-in.

The motor-driven steering assist apparatus 10 is structured such that an upper end portion of the input shaft 21 to which the upper steering shaft 1 is connected by a connecting device 1A is supported to the first housing 11 (FIG. 2) by the bearing 31. Upper and lower end portions of the output shaft 22 to which the lower steering shaft 2 is connected by a connecting device 2A are supported to the second housing 12 and the third housing 13 by upper and lower bearings 32A and 32B (FIG. 2). The input shaft 21 is provided with a serration 21A for connected to the connecting device 1A in an upper end outer peripheral portion. The output shaft 22 is provided with a serration 22A for connecting to the connecting device 2A in a lower end outer peripheral portion. A torsion bar 27 is inserted to a hollow portion of the input shaft 21. One end of the torsion bar 27 is coupled to the input shaft 21 by a coupling pin 27A, and the other end of the torsion bar 27 is inserted to a hollow portion of the output shaft 22 so as to be connected by serration.

When steering torque is applied to the steering wheel, the steering torque is also applied to a torsion bar 27 coupling the input shaft 21 and the output shaft 22 via the upper steering shaft 1. The input shaft 21 and the output shaft 22 are relatively rotated on the basis of a torsion generated by the torsion bar 27. Accordingly, the torque sensor 23 detects the steering torque on the basis of displacement in a rotating direction of the input shaft 21 and the output shaft 22, and the electric motor 24 is controlled so as to apply an assist force in correspondence to the steering torque to the output shaft 22.

A torque sensor 23 is provided with two detecting coils 23A and 23B surrounding a cylindrical core 23C engaged with the input shaft 21 and the output shaft 22, in the first housing 11, as shown in FIG. 2. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when a steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. In other words, when the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

The electric motor 24 is attached and supported to the second housing 12 by a mounting bolt 28, and is driven by a controller (not shown) in correspondence to the detected torque of the torque sensor 23.

A worm gear 25 is coupled to a rotation shaft 24A of the electric motor 24 by a joint 24B, and the worm wheel 26 engaging with the worm gear 25 is fixed to the output shaft 22. The worm gear 25 is supported at both ends to the second housing 12 by right and left bearings 41 and 42, as shown in FIG. 3. The worm wheel 26 is fixed to the output shaft 22 just below an upper bearing 32A in the output shaft 22, in an inner portion of the second housing 12.

In this case, the joint 24B coupling the rotation shaft 24A of the electric motor 24 and the worm gear 25 is structured such that a torque limiter 24C constituted by an elastic ring is interposed in a fitting gap between both the elements (FIG. 3).

The torque limiter 24C keeps coupling the rotation shaft 24A and the joint 24B under normal using torque conditions of the motor-driven steering assist apparatus 10, allows them to slip under abnormal torque conditions, and does not transmit the torque of the electric motor 24 to a side of the joint 24B.

Accordingly, in the motor-driven steering assist apparatus, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt 15 (FIG. 2). An oil seal 33 is attached in a sealing manner to an upper opening portion of the bearing 31 in the first housing 11, and an oil seal 34 is attached in a sealing manner to a lower opening portion of the bearing 32B in the third housing 13 (FIG. 2).

Further, the motor-driven steering assist apparatus 10 is structured such that the second housing 12 can be attached to the vehicle body side. The motor-driven steering assist apparatus 10 is structured, as shown in FIGS. 1 and 2, such that elastic members 51 and 52 such as a rubber bush or the like are provided in both sides of attaching bosses 12A provided at a plurality of positions, for example, three positions, in a peripheral direction of an outer periphery of the second housing 12. The attaching bosses 12A are pinched between upper and lower support pieces 18A and 18B of forked support portions 18 provided at a plurality of positions corresponding to the attaching bosses 12A of the vehicle body side attaching bracket 17 via the elastic members 51 and 52. The attaching boss 12A is pinched in a floating fixed state between the upper and lower support pieces 18A and 18B via the elastic members 51 and 52 by an attaching bolt 16 (a nut 16A) inserted and attached to a bolt hole provided in each of he support pieces 18A and 18B of the forked support portion 18, the elastic members 51 and 52, and the attaching bosses 12A. The vehicle body side bracket 17 is supported to the vehicle body frame.

Accordingly, in the motor-driven steering assist apparatus 10, there are provided with (A) a first steering angle regulating means 100 for preventing the electric motor 24 from being driven for no purpose when the steering wheel is steered to the maximum, and (B) a second steering angle regulating means 200 for preventing the electric motor 24 from being driven to no purpose even if the inverse input is applied from the tire wheel side when the steering wheel is steered to the maximum, as described below.

Figure 4:
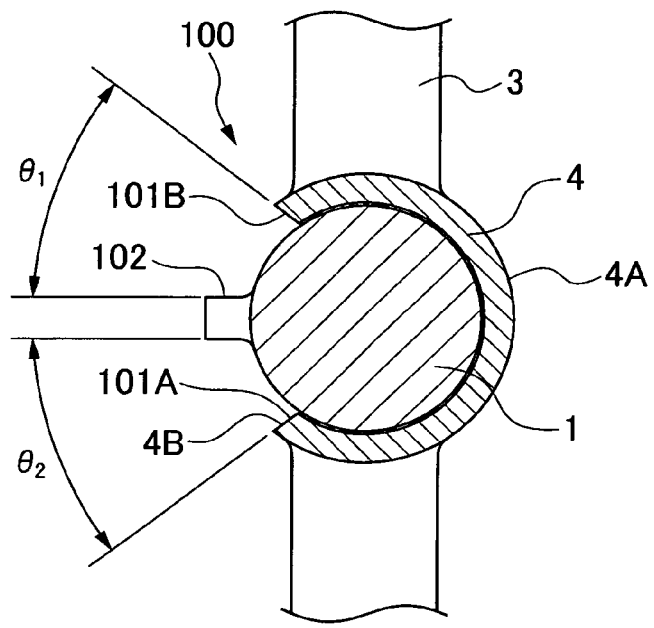
FIG. 4 is a cross sectional view showing a steering angle regulating means of an upper steering shaft along a line IV-IV in FIG. 1.

(A) First Steering Angle Regulating Means 100 (FIGS. 1 and 4)

The first steering angle regulating means 100 is provided between the upper steering shaft 1 and the vehicle body side, and limits the maximum steering angle of the upper steering shaft 1.

The first steering angle regulating means 100 is structured, as shown in FIGS. 1 and 4, such that both left and right side portions of an open portion 4B obtained by partially notching an annular wall 4A of an annular support member 4 provided in the upper vehicle body side stay 3 are formed as left and right stopper portions 101A and 101B. A protruding portion provided in a portion pinched between the left and right stopper portions 101A and 101B of the opening portion 4B in the outer periphery of the upper steering shaft 1 is formed as a stopped portion 102. The opening portion 4B is provided so as to normally face a front face or a back face facing to, for example, a front side of the vehicle of the annular wall 4A. In the case that the steering wheel is at a neutral position, the stopped portion 102 of the upper steering shaft 1 exists in a center in the rotating direction with respect to the left and right stopper portions 101A and 101B of the support member 4. A left steering angle θ1 exists between the stopped portion 102 and the stopper portion 101A, and a right steering angle θ2 exists between the stopped portion 102 and the stopper portion 101B (θ1=θ2). When the steering wheel and the input shaft 1 reach left or right maximum steering angles θ1M or θ2M (θ1M=θ2M), the stopped portion 102 of the upper steering shaft 1 is brought into contact with the left or right stopper portions 101A or 101B of the support member 4 so as to be braked. A relation θ1M=θ1 and θ2M=θ2 is established.

In accordance with the present embodiment, the following operations and effects can be obtained.

(a) When the steering wheel is steered to the maximum, the maximum steering angle of the upper steering shaft 1 to which the steering wheel is coupled is limited by the first steering angle regulating means 100. Accordingly, in the maximum steering state, the upper steering shaft 1 and the input shaft 21 do not continue twisting the torsion bar 27, and the torque sensor 23 does not continue detecting the steering torque. The electric motor 24 does not carry on driving for no purpose after the output shaft 22 and the lower steering shaft 2 reach the steering stroke end.

(b) It is possible to easily structure the first steering angle regulating means 100 by the stopper portions 101A and 101B in the vehicle body side, and the stopped portion 102 of the upper steering shaft 1.

Figure 5:
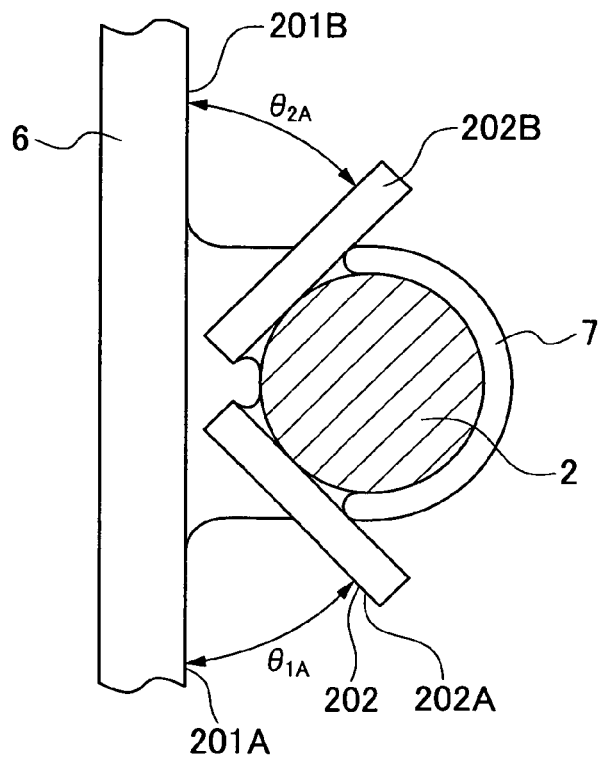
FIG. 5 is a cross sectional view showing a steering angle regulating means of a lower steering shaft along a line V-V in FIG. 1.

(B) Second Steering Angle Regulating Means 200 (FIGS. 1 and 5)

The second steering angle regulating means 200 is provided between the lower steering shaft 2 and the vehicle body side, and limits the maximum steering angle of the lower steering shaft 2.

The second steering angle regulating means 200 is structured, as shown in FIGS. 1 and 5, such that left and right stopper portions 201A and 201B are provided in the vehicle body side stay 6 in a front face, or a back face, facing to, for example, the front side of the vehicle of the support member 7, when setting the support member 7 to the lower vehicle body side stay 6. A V-shaped stopped portion 202 is provided in a portion pinched between the left and right stopper portions 201A and 201B in the outer periphery of the lower steering shaft 2. The stopped portion 202 has plate-like pieces 202A and 202B which are formed in a V shape by being welded or otherwise fixed to two left and right positions in the outer periphery of the lower steering shaft 2.

In the case that the steering wheel is at a neutral position, the stopped portion 202 of the lower steering shaft 2 exists in a center in the rotating direction with respect to the left and right stopper portions 201A and 201B of the vehicle body side stay 6. A left steering angle θ1A exists between the stopped portion 202 and the stopper portion 201A, and a right steering angle θ2A exists between the stopped portion 202 and the stopper portion 201B (θ1A=θ2A). When the lower steering shaft 2 reaches maximum steering angles θ1M or θ2M (θ1M=θ2M) together with the upper steering shaft 1 on the basis of forces applied to the steering wheel and the input shaft 1, the stopped portion 202 of the lower steering shaft 2 is close to or brought into contact with the left or right stopper portions 201A or 201B of the vehicle body side stay 6 so as to be braked. A relation θ1M=θ1A and θ2M=θ2A is established.

In this case, in accordance with the present embodiment, since the first steering angle regulating means 100 in the side of the upper steering shaft 1 is provided in parallel to the second steering angel regulating means 200 in the side of the lower steering shaft 2, it is preferable to first bring the stopped portion 102 of the first steering angle regulating means 100 into contact with the stopper portion 101A or 101B and next bring the stopped portion 202 of the second steering angel regulating means 200 into contact with the stopper portion 201A or 201B (θ1<θ1A, θ2<θ2A), when rotating the steering wheel and the input shaft 1 to the maximum steering angle position and setting the lower steering shaft 2 to the maximum steering angle position by extension.

In accordance with the present embodiment, the following operations and effects can be obtained.

(a) If the inverse input is applied from the tire wheel side when the steering wheel is steered to the maximum, the second steering angle regulating means 200 limits the maximum steering angle of the lower steering shaft 2. Accordingly, in the maximum steering state, the lower steering shaft 2 and the input shaft 22 do not continue twisting the torsion bar 27, and the torque sensor 23 does not continue detecting the steering torque. The electric motor 24 does not continue driving for no purpose after the output shaft 22 and the lower steering shaft 2 reach the steering stroke end.

(b) It is possible to easily structure the second steering angle regulating means 200 by the stopper portions 201A and 201B in the vehicle body side, and the stopped portion 202 of the lower steering shaft 2.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. In the present invention, the gear train transmitting the rotation of the electric motor to the output shaft is not limited to the structure constituted by the worm gear and the worm wheel.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A support structure of a motor-driven steering assist apparatus interposed between an upper steering shaft in a steering wheel side and a lower steering shaft in a tire wheel side, wherein a steering angle regulator for limiting a maximum steering angle of the upper steering shaft is provided between the upper steering shaft and the vehicle body side, the steering angle regulator is constituted by a stopper portion provided in the vehicle body side and a stopped portion provided in the upper steering shaft, and the stopped portion of the upper steering shaft is braked by the stopper portion in the vehicle body side at a time when the upper steering shaft reaches the maximum steering angle, the motor-driven steering assist apparatus rotatably supports the upper steering shaft to an upper vehicle body side via a bearing by a support member, the support member is formed in an annular shape having an opening portion obtained by partly notching an annular wall in a peripheral direction, and both right and left side portions in the opening portion of the annular wall in the annular support member are formed as the right and left stopper portions, and a protruding portion provided in a pinched between the right and left stopper portions of the opening portion in an outer periphery of the upper steering shaft is formed as the stopped portion.

2. A support structure of a motor-driven steering assist apparatus as claimed in claim 1, wherein the opening portion is provided so as to normally face to a front face or a back face facing to a front side of the vehicle of the annular wall, and the stopped portion of the upper steering shaft exists at a center in a rotating direction of the support member with respect to the right and left stopper portions, at a time when the steering wheel exists at a neutral position.

3. A support structure of a motor-driven steering assist apparatus interposed between an upper steering shaft in a steering wheel side and a lower steering shaft in a tire wheel side, wherein a steering angle regulator for limiting a maximum steering angle of the lower steering shaft is provided between the lower steering shaft and the vehicle body side, wherein the steering angle regulating means is constituted by per portion provided in the vehicle body side and a stopper portion provided in the lower steering shaft, and the stopped portion of the lower steering shaft is braked by the stopper portion in the vehicle body side at a time when the lower steering shaft reaches the maximum steering angle, the lower steering shaft of the motor-driven steering apparatus is rotatably supported to a lower vehicle body side stay via a bearing by a support member, the right and left stopper portions are provided in a vehicle body side stay in a front face or a back face facing to the front side of the vehicle of the support member, at a time when the support member is provided in the lower vehicle body side stay, and the V-shaped stopped portion is provided in a portion pinched between the right and left stopper portions in an outer periphery of the lower steering shaft.

4. A support structure of a motor-driven steering assist apparatus as claimed in claim 3, wherein the stopped portion is constituted by a plate-like piece formed in a V shape with each other by being welded to two right and left positions of the lower steering shaft.

* * * * *